United States Patent [19]

Jansen

[11] 3,805,835
[45] Apr. 23, 1974

[54] FLUID CONTROL VALVE
[75] Inventor: Harvey B. Jansen, Tempe, Ariz.
[73] Assignee: The Garrett Corporation, Los Angeles, Calif.
[22] Filed: May 12, 1972
[21] Appl. No.: 252,782

[52] U.S. Cl............. 137/625.3, 251/61, 251/282, 138/46
[51] Int. Cl........................ F16k 25/02, F15d 1/10
[58] Field of Search....... 137/625.3, 625.61, 625.62; 251/282, 61; 138/46

[56] References Cited
UNITED STATES PATENTS
2,813,519  11/1957  Persson et al.......................... 91/49
3,065,145  11/1962  Molander et al. ............. 137/625.62
3,096,690   7/1963  Hayner ....................... 137/625.62 X Primary Examiner—Arnold Rosenthal
Attorney, Agent, or Firm—Jack D. Puffer; Albert J. Miller

[57] ABSTRACT

A valve for metering fluid flow having a metering post with a central fluid passage open at one end and having opposed metering openings connected with the central passage at the other end. Bifurcated movable metering element straddling the metering post for opening and closing said metering openings in response to control signals.

15 Claims, 5 Drawing Figures

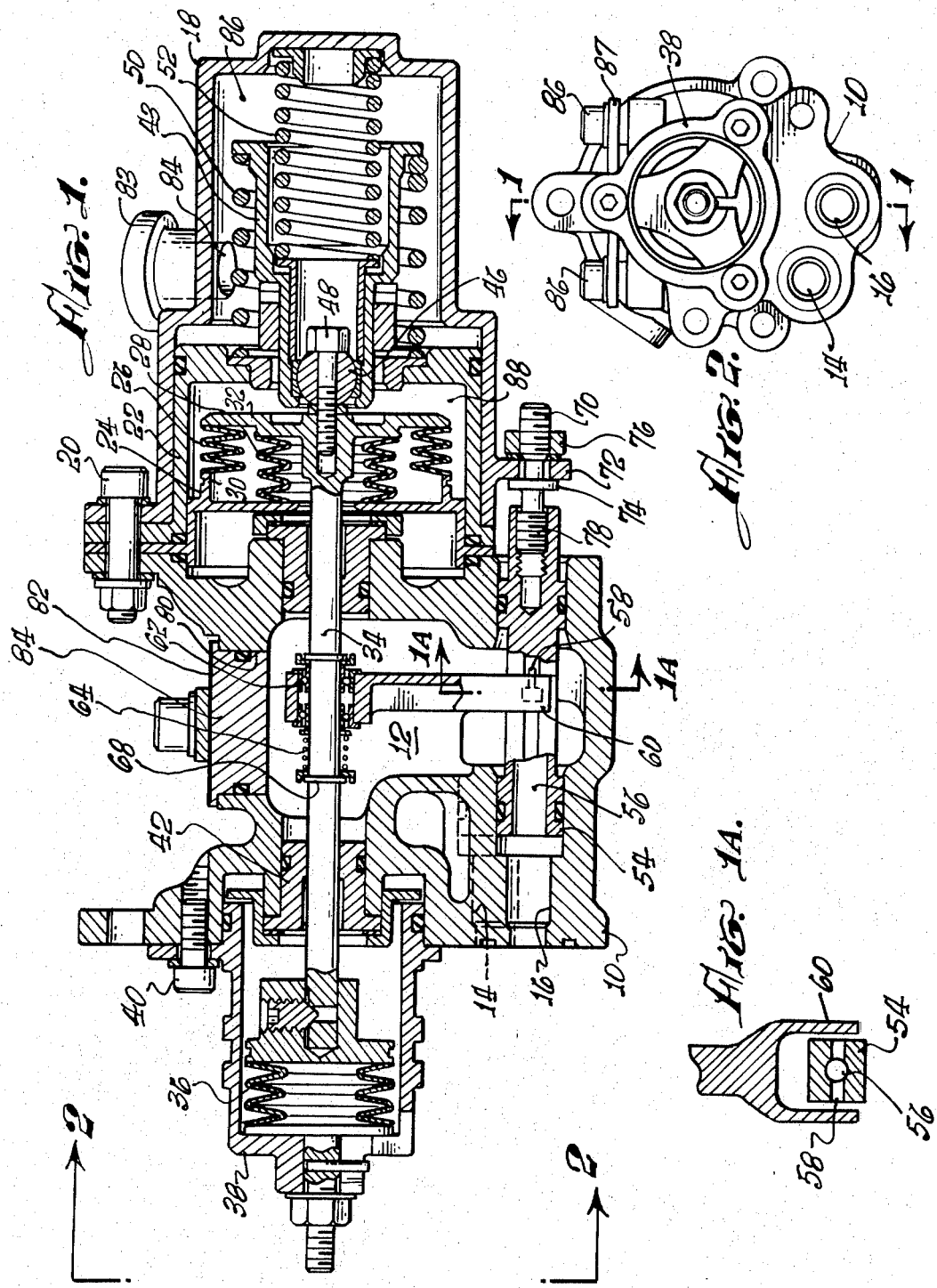

FLUID CONTROL VALVE

BACKGROUND OF THE INVENTION

This invention relates to valve devices generally, and more particularly, to valves for metering fluid flows. The existing flow controlling valves are of various types including ball valves, slide valves, and flapper valves. The principal difficulties encountered in the operation of these valves are contamination of the metering orifice, mechanical hysteresis in the moving portions of the valve and high power consumption where the fluid is metered at high pressures. These difficulties are caused by the inherent pressure differential between the fluid source at high pressure and the outlet of the valve which is substantially lower pressure. This pressure differential requires that the valves include seals to prevent leakage of fluid around the metering device element which causes inherent high friction when the metering element must slide against the high pressure seal. These seals are also one source of hysteresis in the valve which degrades the frequency response in the case of high speed operation or tight closed-loop servo applications.

In order to provide precise metering of fluid flow it is necessary that the flow path through the valve be precisely constructed and usually requires relatively small openings at the output of the valve. If the fluid to be metered becomes contaminated with dust, dirt, or other foreign matter, this contamination, when it adheres to the walls of the precision fluid paths within the valve, causes the calibration to change and thus the overall accuracy of the valve is affected.

This invention overcomes the problems of the present metering valves by providing a device which is completely pressure balanced to eliminate high and hysteresis and hysteresis and provides a metering element which does not depend upon physical contact with any other part of the valve for its metering function. The elimination of sliding contact between metering elements of the valve and the pressure balancing aspect thereof allows the valve to be operated with relatively low power consumption and yet at high frequencies with excellent frequency response characteristics.

SUMMARY OF THE INVENTION

The fluid metering valve of the instant invention is comprised of a metering post which has a central opening through its length, open at one end to receive fluid to be metered and closed at the other end. Intermediate the ends of the metering post are opposing openings extending through the wall of the metering post and connecting the central opening with the ambient atmosphere. Thus the metered fluid can enter through the open end of the post and exit through the opposing openings. The fluid, as it exits these openings, is controlled or metered by means of a bifurcated element or clevis which straddles the metering post and whose arms extend sufficient length to cover the openings in the metering post. Thus when the clevis arms completely cover the metering holes the fluid flow is at a minimum. To increase the flow the clevis is moved along the length of the metering post to expose a portion of the metering hole sufficient to allow the desired flow. As can be seen from this description there is no sliding contact between the clevis and the metering post and further, flow from the opposing metering holes balances the external forces acting upon the clevis element. Additionally, the valve is self-cleaning of contaminants in that the metering function is achieved not by the size of the metering holes but by that portion of the hole which is exposed by the clevis arms.

It is therefore an object of this invention to provide a valve having low power consumption, low hysteresis and high contamination resistance.

It is another object of this invention to provide a fluid control valve in which the metering element is spaced from the valve.

It is another object of this invention to provide a fluid metering valve of simple construction and inherent high reliability with low maintenance requirements.

DESCRIPTION OF THE DRAWINGS

In the drawing:

FIG. 1 is a longitudinal partial section of the valve,

FIG. 1A is a partial sectional view taken along line 1A—1A of FIG. 1,

FIG. 2 is an end view of the valve of FIG. 1,

DESCRIPTION OF THE INVENTION

Figure 3:
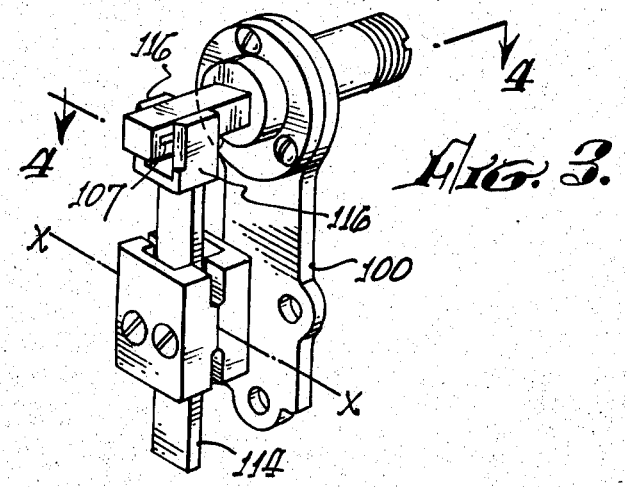
FIG. 3 is a perspective view of an alternate embodiment of the valve.

Referring now to FIG. 1 of the accompanying drawing, there is illustrated one embodiment of the valve of this invention.

The valve consists of a main body member 10 which has a fluid cavity 12 therein and a fluid inlet port 14 and fluid exit port 16. Closing one end of the body member 10 is a first cap member 18 attached to the body member by bolts 20. Also attached to the body member and concentric with end cap 18 is a spring seat member 22 and a bellows assembly 24 both of which are attached to the body member 10 by the same bolts 20. The bellows assembly 24 includes a first bellows 26 and a second bellows 28 which is mounted within bellows 26. One end of each of these bellows is sealed by cap member 32 and the other end by the bellows body member 30. Attached to and forming a portion of the cap member 32 is a rod section 34 which extends through the body 12 and terminates in a second bellows assembly 36. Bellows 36 is mounted in a second end cap member 38 which is attached to the body member 10 by means of bolts 40. The shaft 34 is slidably mounted in the body member by means of bushings 42 at either end of the fluid cavity 12. The other end of shaft 34 is supported by ball member 46 retained in the spring retainer 42 and attached to the shaft 34 by means of bolt 48. Shaft 34 is biased mechanically toward its ball supported end by means of springs 50 and 52. The operation of these springs will be discussed in detail below.

Below shaft 34 and parallel to it there is provided a metering post member 54 mounted in the body member 10 and extending through the fluid chamber 12. Metering post 34 contains a center opening 56 which communicates with transverse opposed metering openings 58 which in turn open into the fluid cavity 12. One end of passage 56 communicates with the outlet port 16 in the body and the other end is closed. There is mounted on shaft member 34 a metering clevis member 60 which is bifurcated at its lower end and which straddles the metering post 54 at points opposite the metering openings 58. The clevis member 60 is mounted on shaft 34 by means of ball bearings 62 in order that it may freely rotate on the shaft. The bearings and clevis member are retained on the shaft by means of pins 68 and springs 64. The metering post 54 is slidably mounted in the body member to provide a fine adjustment for alignment of the metering openings with the opposed clevis faces. Adjustment is provided by means of screw 70 which is rotatably mounted in flange 72 of the cap 18. The screw is retained in the flange by means of nut 76. Rotation of the screw 70 in the flange moves the metering post within its housing through the action of screw threads 78 within the post. Once the adjustment is made the metering post is retained in place by lock nut 76. There is provided in the body member 10 a central opening 80 which, in the fully assembled valve, is closed by plug member 84 which is attached to the body member by means of screws 86 which fasten a bar clamp member 88 to the body over the plug member.

In the operation of the device of FIGS. 1 and 2, the fluid to be metered is supplied under pressure to port 14 and is thus introduced into the cavity 12 in the body 10. The pressurized fluid in cavity 12 will then enter the metering post through the opposed metering openings 58; flow through the central opening in the metering post 56 and out the exit port 16. As can be seen, the amount of fluid flowing in the exit port will be dependent upon the amount of the metering hole 58 which is exposed by the clevis member 60. The amount of the opening exposed will, of course, depend upon the position of the clevis member with relation to the opening. As was previously described the clevis member 60 is rotatably mounted on shaft 34 which may slide longitudinally in bushings 42. In this embodiment the motion of shaft 34 and hence the position of the clevis member is controlled by the action of a second actuating fluid which is introduced into fitting 83 and into cavity 86 of end cap 18 through an opening 84 therein. The actuating fluid may then flow around the spring retaining member 42 and into the cavity 88 in which the bellows assembly 24 is retained. The internal chamber of bellows 26 is evacuated and completely sealed. Thus the actuating fluid acting upon the flange 32 will tend to cause the bellows to be compressed and shaft 34 to slide in its bushings in a direction to expose more of the metering openings 58. The motion of the shaft in a direction to increase flow is opposed by the action of spring 50. Thus as the pressure is reduced the shaft will tend to return to its neutral position by the force of spring 50. The spring 52 acting against the end cap 18 and spring retainer 42 opposes the action of spring 50. By forming springs 50 and 52 of different materials having different thermal expansion characteristics the net spring force acting upon the shaft is maintained substantially constant over the operating temperature range of the valve.

The clevis member 60 is rotatably mounted on the shaft 34 in order to insure that it will always be centered over the metering post 54 during operation. The centering is assured by the balanced characteristic of this assembly. As shown in FIG. 1A the fluid flow between the clevis member 60 and the metering post 54 will be equally balanced in pressure on both sides of the metering post. Thus the clevis effectively floats on the thin film of the metering fluid precisely centered over the metering post by the balanced fluid pressures. This centering of the clevis on the post assures the minimum friction between the clevis and the post and provides a practically hysteresis free operation.

Figure 4:
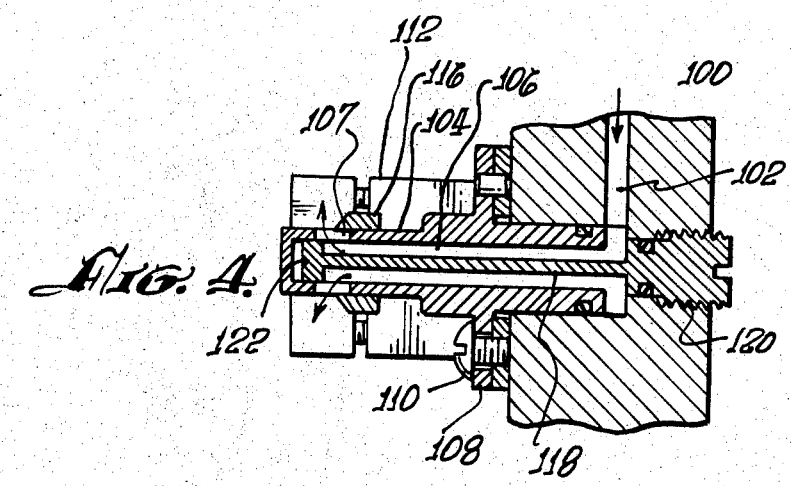
FIG. 4 is a sectional view of the valve of FIG. 3 of the invention taken along line 3—3.

Referring now to FIGS. 3 and 4, there is shown an alternate embodiment of the invention. The valve body 100 is provided with a fluid passage 102 to admit the metered fluid to the valve. A metering post 104 having a central fluid passage 106, is attached to the body member by means of screws 110 and flange 108 which is part of the metering post. Also attached to the flange 108 is an electric torque motor stator 112 which is connected to a signal source, not shown. Forming the rotor of the torque motor assembly is a clevis post 114 which terminates in a bifurcated portion 116 which straddles the metering post and covers at least a portion of the metering holes 107 in the post. In the metering post there is also provided a calibration piston 118 which is attached to the body member by means of threads 120 and has at other end a piston head member 122. When the clevis member 116 is in its neutral position the piston head may be moved with respect to the metering openings by means of threads 120 to provide the initial adjustment of the size of the metering openings 107.

The operation of this embodiment of the invention is very similar to that described in connection with FIGS. 1 and 2 above. The fluid to be metered enters the body member through opening 102 and flows into the metering post through the interconnecting passage 106 in the metering post. The fluid then will flow out the metering openings 107. In response to electrical signals from a signal source (not shown) the torque motor 112 will rotate the clevis rod 114 about axis X—X. This rotation will cause the clevis members 116 to expose more or less of the metering openings 107 and therefore adjust the flow through the valve in accordance with the electrical input signal.

As in the previous embodiment the fluid pressure between the metering post and the clevis valve member is equally balanced and the clevis member 116 will be exactly centered on the metering post with no physical contact between them. Because of this automatic centering feature the clearance between the clevis and the post may be made very small on the order of 0.0002 inches since there is no sliding friction in this device the hysteresis of the valve and its operating power consumption are substantially reduced.

While the metering holes in the embodiments shown are of a regular symmetrical shape, it will be appreciated by those skilled in the art that these holes can be formed in a variety of shapes. The output of the valve can thus be characterized to give linear, nonlinear or combination output.

Thus it can be seen that there is provided by this invention a versatile fluid metering valve of simple construction having low hysteresis and power consumption providing inherent good frequency response and good metering capability. Also inherent in the design is a self-cleaning feature which prevents contamination of the metering opening by contaminants in the metered fluid.

While specific embodiments of the invention have been illustrated and described, it is to be understood that these embodiments are provided by way of example only and that the invention is not to be construed as being limited thereto, but only by the proper scope of the following claims.

What is claimed is:
1. A fluid control valve comprising:
a body member having a fluid passage therein said passage being open at one end and having opposed metering openings at the other end communicating with said passage;
movable metering means having portions in registry with said metering openings and spaced apart from said body member for covering and uncovering said metering openings in response to movement of said metering means said metering means being arranged to provide balanced flow from said metering openings;
second metering means for adjusting the size of the metering openings; and
actuation means for moving said metering means in response to control signals.

2. A fluid control valve according to claim 1 wherein said metering means is a bifurcated element said bifurcations being in registry with said metering openings.

3. A fluid control valve according to claim 1 wherein the signals for controlling said actuation means are fluid pressure signals.

4. A fluid control valve according to claim 1 wherein said actuation means is an electro-mechanical means.

5. A fluid control valve comprising:
a body member having a fluid inlet passage, a fluid outlet passage and a central cavity in communication with said passages;
a metering post mounted in said body member having a central passage therein open at one end and in communication with one of said passages and opposed metering openings at the other end in communication with said central opening and said cavity, said metering openings lying on an axis transverse to the longitudinal axis of said central passage;
a movable metering member mounted in said body member and having portions thereof in registry with and spaced apart from said metering openings and arranged with respect to said metering post to provide balanced flow from said metering openings; and
actuation means mounted in said body member for moving said metering member with respect to said metering post for varying the fluid flow between said metering post and said cavity.

6. A fluid control valve according to claim 5 wherein said metering post is movable within said housing for adjusting the registration between said metering member and said metering openings.

7. A fluid control valve according to claim 5 wherein the central passage of said metering post is in communication with the outlet passage of said body member.

8. A fluid control valve according to claim 5 wherein said metering member is a bifurcated member having its bifurcated portions on either side of said metering post in registry with said metering openings.

9. A fluid control valve according to claim 8 and further comprising:
a metering shaft movably mounted in said body member having its longitudinal axis substantially parallel to the longitudinal axis of the central passage in said metering post and operably connected to said actuation means; and means for rotatably mounting said metering means on said metering shaft for rotation about the longitudinal axis of said shaft.

10. A fluid control valve according to claim 9 and further comprising:
a source of pressurized control fluid;
a second fluid cavity in said body member separated from said first cavity and having a control fluid inlet opening therein;
fluid actuation means responsive to said control fluid pressure in said second cavity and operably connected to said metering shaft; and
means connected to said metering shaft for opposing the action of said actuating means for restoring said metering means to a neutral position when said actuating means is not energized.

11. A fluid control valve according to claim 10 wherein said means for opposing the action of said actuating means comprises:
a first spring for urging said metering shaft in one direction; and
a second spring for urging said metering means in the other direction, one of said springs having a spring rate higher than the other of said springs and said springs being of material having different coefficient of expansion whereby the net spring rate of said first and second springs is constant over a specified temperature range.

12. A fluid control valve comprising:
a body member having a central opening therethrough and a fluid passage connected to said opening;
a metering post mounted in the central opening of said body member and having a fluid passage extending along its longitudinal axis and in communication with the fluid passage of said body member at one end and having opposed metering openings at the other end, said metering openings lying on an axis transverse to the longitudinal axis of said post;

metering means having portions in registry with said metering openings and spaced apart from said metering post;
means for adjusting the size of the metering openings for calibration thereof; and
actuation means operably connected to said metering means for varying the size of said metering openings in response to control signals, said metering means and said metering openings being arranged to provide balanced fluid flow from said metering openings.

13. A fluid control valve according to claim 12 wherein said metering means is a bifurcated member having its bifurcated portions in registry with said metering openings and a shaft portion connected to said actuating means.

14. A fluid control valve according to claim 13 wherein said actuation means is a rotational actuator operably connected to said metering means for rotating said metering means about an axis substantially parallel to the axis of the metering openings.

15. A fluid control valve according to claim 12 wherein said adjusting means comprises an adjustable piston member mounted in the fluid passage of said metering post and having a piston head in registry with said metering openings, said piston member being movably connected to said body member for adjustment of the degree of registry of said piston head with said metering openings.

* * * * *